Dec. 25, 1962 V. E. HEYWOOD ETAL 3,069,982
MANUFACTURE OF QUICK-OPENING ENVELOPES OR BAGS
Filed Feb. 11, 1960 6 Sheets-Sheet 1

Inventors:
Vincent E. Heywood
Henry J. Ruggeri
by George H. Kennedy Jr. Attorney Dec. 25, 1962 V. E. HEYWOOD ETAL 3,069,982
MANUFACTURE OF QUICK-OPENING ENVELOPES OR BAGS
Filed Feb. 11, 1960 6 Sheets-Sheet 2

INVENTORS:
Vincent E. Heywood
Henry J. Ruggeri
BY George H. Kennedy jr.
ATTORNEY Dec. 25, 1962 V. E. HEYWOOD ETAL 3,069,982
MANUFACTURE OF QUICK-OPENING ENVELOPES OR BAGS
Filed Feb. 11, 1960 6 Sheets-Sheet 4

FIG. 8.

Inventors:
Vincent E. Heywood
Henry J. Ruggeri
by [signature] Attorney

Dec. 25, 1962   V. E. HEYWOOD ETAL   3,069,982
MANUFACTURE OF QUICK-OPENING ENVELOPES OR BAGS
Filed Feb. 11, 1960   6 Sheets-Sheet 5

Inventors:
Vincent E. Heywood
Henry J. Ruggeri
by George H. Kennedy Jr.
Attorney Dec. 25, 1962 V. E. HEYWOOD ET AL 3,069,982
MANUFACTURE OF QUICK-OPENING ENVELOPES OR BAGS
Filed Feb. 11, 1960 6 Sheets-Sheet 6

Inventors:
Vincent E. Heywood
Henry J. Ruggeri
by George H. Kennelly, Attorney

United States Patent Office 3,069,982
Patented Dec. 25, 1962

3,069,982
MANUFACTURE OF QUICK-OPENING
ENVELOPES OR BAGS
Vincent E. Heywood, Worcester, and Henry J. Ruggeri, Springfield, Mass., assignors to United States Envelope Company, Springfield, Mass., a corporation of Maine
Filed Feb. 11, 1960, Ser. No. 8,084
17 Claims. (Cl. 93—63)

This invention relates generally to the manufacture of open end bags or envelopes of substantially center seam type. More particularly, the invention is concerned with the rapid production, from sheet or film material supplied in continuous web form, of various sizes of such bags or envelopes, all provided with the quick-opening bottom seam construction which is shown and described by Irrgang Patent No. 1,972,995 of September 11, 1934.

In the bag or envelope of this Irrgang patent, the customary transverse bottom seam turn-up or flap is not adhered directly (as in ordinary envelopes of this type) to the container wall. Instead, said bottom flap's stick-down to the body or wall is through an interposed narrow strip of loose-fibred material, whose opposite surfaces are glued respectively to said wall and to said turned-up flap. Thus it is that by a light pull on said bottom flap's free edge, the interposed loose-fibred strip is cleanly split asunder in a plane of cleavage paralleling its surfaces. This gives an instant full width opening of the envelope, for discharge of its contents, without any tearing, shredding or mutilation of the envelope material.

These quick-opening envelopes or bags of said Irrgang patent, very useful in the consumer handling of packaged foodstuffs and the like, have long been made in large quantities, but heretofore only from paper. This is because the machinery for their production has required an initial supply of precut individual flat blanks, of the proper size and shape (see FIG. 1 of said Irrgang patent) to be folded, by conventional envelope-making procedures, into envelope form. This fact has precluded their commercial manufacture from cellophane and various other thin transparent film materials now so widely used in foodstuff packaging, because these film materials, by reason of their extreme thinness, flaccidity, and lack of resistance to tear, are not susceptible of being handled in conventional envelope-making machinery of this blank-supply type.

On the other hand, open end envelopes or bags of ordinary construction (i.e. without this Irrgang quick-opening feature) have long been successfully and rapidly produced, in tremendous quantities, from these self-same very weak and flaccid transparent film materials. But this production has always been on web-supply (rather than blank-supply) envelope machinery, substantially of the type shown and described by Novick Patent No. 2,131,748 of October 4, 1938. In such and similar web-supply machinery, well known in the art, a continuously advancing web of transparent film material is progressively converted, by edgewise gluing and by gradual fold-in of its side portions, to a flattened tubular substantially center-seamed form. Successive flat tubular blanks cut off transversely from the leading end of this advancing flattened tubular web, are quickly converted to open end envelope form by endwise movement between a pair of "bottoming" cylinders (a tucker blade cylinder and a gripper cylinder) both rotating at blank speed, and co-operating to produce near each blank's leading end, a transverse bottom fold or turn-up which is adhered to each blank's wall by adjacent transverse gluing which said tucker blade cylinder puts on the blank.

We have discovered that such and similar web supply machinery, long used for the high speed production, from transparent film material, of ordinary open end envelopes or bags can readily be adapted to the making of such products with the quick-opening bottom seam construction of the aforesaid Irrgang patent. Our invention secures these results, without any sacrifice of the machine's production speed or range of adjustability, by arranging for one of its blank advancing rolls or cylinders, preferably its rotary tucker blade cylinder, to deposit broadside, internally, at each blank's bottom turn-up zone a narrow adhesive-surfaced strip of loose-fibred material, in position to be adhesively sandwiched, by the machine's usual transverse "bottoming" operation, between the blank wall and the bottom flap or turn-up. In this fashion, we have achieved the rapid commercial production, for the first time, from transparent film material, of open end envelopes or bags, all having the extremely useful quick-opening bottom seam construction of the aforesaid Irrgang patent.

Other and further objects, advantages and novel features of our invention will become apparent from the following detailed description thereof, taken in connection with the accompanying illustrative drawings, in which.

The drawings herein show such portions of the apparatus of said Novick Patent No. 2,131,748 as are needed for an understanding of our instant invention. As shown in Novick, and herein by FIGS. 1 and 2, a relatively wide web 1 of the film material from a supply reel 2 is drawn around and over suitable guide rollers 3 and 4, by a pair of forwardly positioned constantly-rotating feed rollers 5, 6. Before reaching said feed rollers 5, 6, the flat web 1 is converted, in the usual fashion, to double-thickness flattened tubular form (see T, FIG. 2) by folding action on its advancing side portions of conventional laterally-adjustable folding plates 7, 7 cooperating with an elongated plate 8 which overlies the central portion of the advancing web material. By this well-known side folding action, the advancing web's opposite lateral edges (one of which has previously been supplied with wet glue) are brought progressively into overlapped center seam-forming relationship.

Before this infolding operation, the flat web's side portions preferably undergo the usual cutting of opposed sets of sizable notches N, N therein, at spaces or intervals determined by the desired length of the flat tubular blanks B, B, which are cut successively, beyond feed rolls 5, 6, from the leading end of the advancing flattened tubular web T. For cutting of such notches N, N, the flat web's side portions, after passing over guide roller 4, pass between a bed roller 9 and a pair of laterally-adjustable notching cutters 10, 10 carrying suitable blades 10ª, 10ª by which said notches N, N are formed. The chips resulting from these web-notching operations may be disposed of in any suitable way, as for example by the chip disposal means shown and described in said Novick patent.

Figure 1:
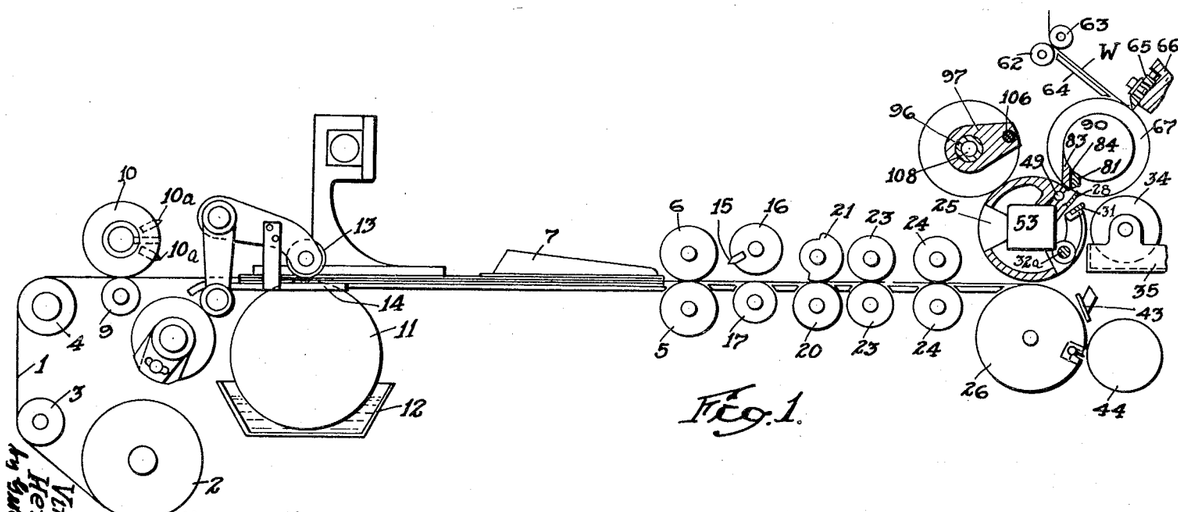
FIG. 1 is a side elevational view, partly in section, illustrating the application of our invention to conventional envelope making apparatus of the web supply type, such as shown in said Novick Patent No. 2,131,748.
Figure 2:
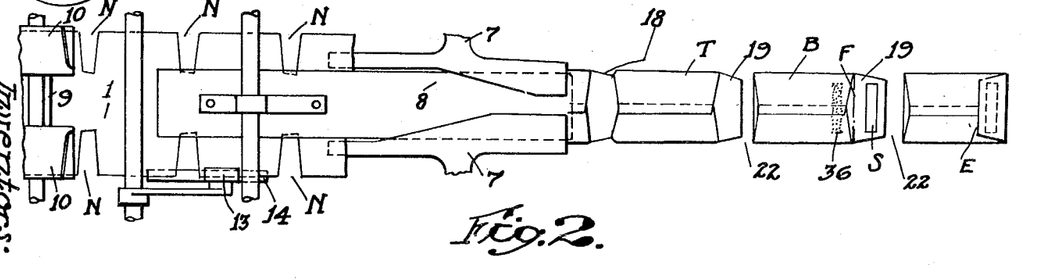
FIG. 2 is a plan view, partly diagrammatic, showing the envelope or bag making sequence performed by the apparatus of FIG. 1.

For gluing a single edge of the advancing flat web 1, before its side portions are folded inwardly, we make the usual provision for said edge's passage over a conventional rotary gluing disc 11, running in a receptacle 12 containing liquid glue. In cases where the above-mentioned notches N, N have been formed in the advancing web's side portions, this edge gluing disc 11 is preferably supplemented, as shown in FIG. 1, by a conventional pressing roller 13, and a conventional web-lifting plate or shoe 14. These last two elements are suitably raised and lowered in unison, to keep the edges of notches N, N free of glue, and to prevent the web edge portions between said notches from sticking to and being drawn down by the gluing disc 11, all as fully described in the aforesaid Novick Patent No. 2,131,748.

Just beyond the pull rolls 5, 6, the flat tubular web T is cut into successive flat tubular blanks B, B of the desired length, by a blade 15, carried by a suitable rotor 16 and cooperating with an underlying bed roller 17. In cases where the flat web's side portions have been notched, as above described, the successive transverse cut-offs by the severing blade 15 are at the leading ends of these meeting notched-out areas 18 of the advancing flattened tubular web T, such as to give each flat tubular blank B, at its leading end, a bottom turn-up portion 19 which is of single thickness. In any event, whether each blank's leading end portion be of single or of double thickness, it is the turn-up and adhesive stick-down of such leading end portion against the blank wall, that produces the desired transverse "bottoming" of each cut-off flat tubular blank, in the operation of numerous envelope-making machines of this web-supply type as exemplified by the aforesaid Novick patent.

Here, the same as in the apparatus of said Novick patent, the leading end of flattened tubular web T, before each cut off of a blank B therefrom, has advanced between a feed roll 20 and cooperating feed sectors 21, these blank feed elements rotating at a somewhat higher surface speed than the web's pull rolls 5, 6. Thus it is that each flat tubular blank B, upon its severance by cutter 15 is immediately speeded up, to space it appropriately as shown at 22, FIG. 2, from the next-severed blank B. This higher blank speed is maintained here (the same as in the aforesaid Novick patent) by subsequently encountered pairs of blank feeding rollers 23, 23 and 24, 24, which advance the successive blanks B, B in spaced relation to the machine's so-called "bottoming" cylinders. These are a tucker blade cylinder 25 and a gripper cylinder 26, which embody, among other things, the same features and functions as the respective cylinders 125 and 126 of said Novick Patent No. 2,131,748.

That is to say, these "bottoming" cylinders, the same as those of the aforesaid Novick patent (and also of Novick Patent No. 2,097,772 of November 2, 1937) rotate at a surface speed corresponding to the blank speed.

Figures 3, 5:
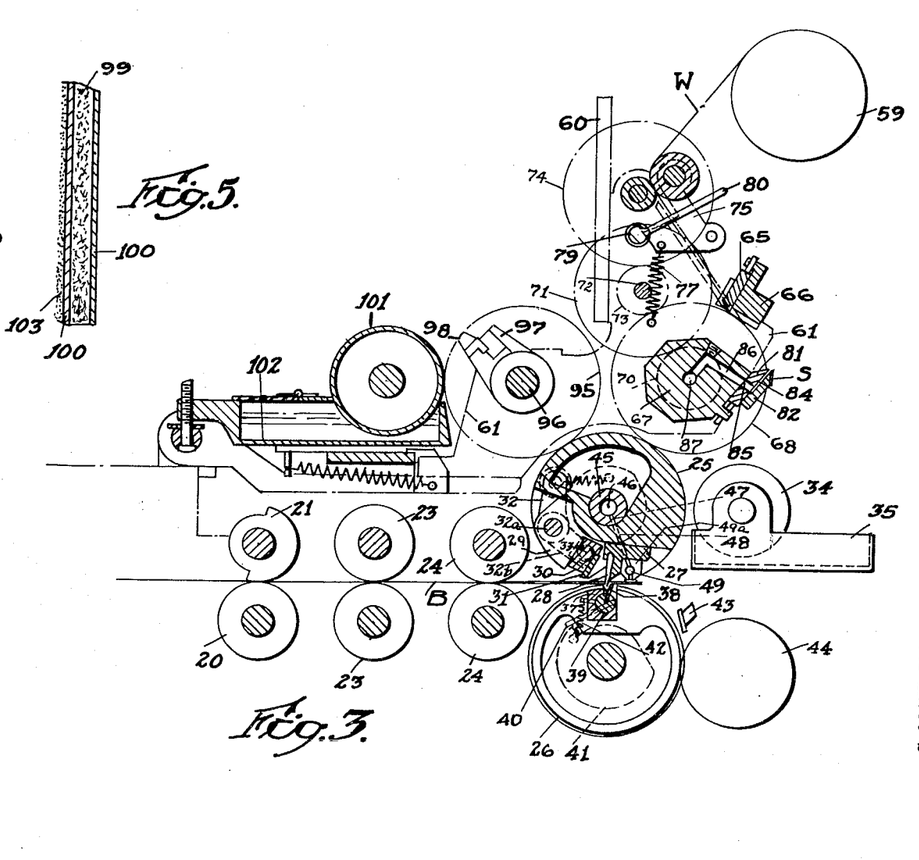
FIG. 3 is a larger scale view, in longitudinal section showing, for one form of our invention, the changes in and additions to the conventional "bottoming" cylinders that are required for the invention's performance.
FIGS. 4 and 5 are large scale fragmentary cross sectional views, showing two different constructions for the strips of loose-fibred material that are supplied for the form of our invention shown by FIG. 3.

As best shown in FIG. 3, the cylinder 25 carries endwise the usual fixed bar 27, which pivotally and yieldingly supports the usual tucking blade 28. Also on cylinder 25 are the usual pair of angularly adjustable segments 29, 29 (only one being here shown) which are radially slotted to receive the usual endwise bar 30, on which is mounted the usual gluing bar or picker 31. The usual cam-operated actuating arm 32 is secured to a shaft 32ª mounted on the segments 29, 29, said shaft 32ª having the usual pair of forked arms 32ᵇ, 32ᵇ (only one being here shown) each embracing a pin 33 on bar 30 for oscillating the latter toward and from the axis of cylinder 25. This customary radial oscillatory movement imparted to the bar 30 serves the usual purpose of projecting the gluing bar or picker 31 beyond the periphery of cylinder 25 at an appropriate point in the cycle, to receive glue from the usual glue roller 34, rotating in a suitable wet glue receptacle 35. The periphery of glue roller 34 thus stands clear of the cylinder 25 so as not to transfer any glue thereto.

It will be understood from the foregoing that picker 31, after so receiving glue from roller 34 is retracted by this usual oscillatory movement to a position substantially flush with the feeding surface of cylinder 25. This enables said picker 31, as explained in both of the aforesaid Novick patents, to apply its glue in a narrow transverse imprint 36 (see FIG. 2) to that portion of each advancing blank's body or wall which is to be covered by its bottom flap or turn-up portion 19, as folded up and back on transverse fold line F by the customary action of these "bottoming" cylinders 25 and 26. Such folding occurs here, the same as in thea foresaid Novick patents, by the action of blade 28 of tucker cylinder 25 in tucking each blank's material, at the base of flap 19, between conventional fixed and movable jaws 37 and 38 respectively of the other "bottoming" cylinder 26. The jaw 37 is a fixed part of said cylinder 26, while the jaw 38 is carried by a rock shaft 39, mounted endwise in said cylinder, and carrying a cam follower 40. The latter travels upon the usual stationary cam 41, and is effective, when riding on said cam's high part, to move the jaw 38 to open position, away from jaw 37. The usual spring 42 moves jaw 38 to closed position as soon as the material of each advancing blank B has been tucked by blade 28 between the two jaws so as to define the transverse fold F.

Each blank B, as thus gripped by its fold F between jaws 37 and 38, moves from then on with cylinder 26, the gluing bar 31 of cylinder 25 having meanwhile imprinted the usual transverse gluing 36 just behind the so-gripped fold F, in position to be covered by the bottom turn-up or flap portion 19 of said blank. In the continued forward and downward movement of each so-gripped blank B by rotary cylinder 26, the blank's folded-up flap portion 19 is carried against the usual stationary folding plate 43, which turns said flap back against the gluing 36 on the blank body. Thereupon, at about the time the jaws 37, 38 open up, to release their grip on the blank's fold F, this adhesion of said flap or turn-up 19 with the blank body is ironed down firmly by the cooperation with gripper cylinder 26 of any suitable pressing means, here shown, for the sake of simplicity, as an adjacent pressing cylinder 44, associated if desired with any suitable delivery mechanism for the successive so-bottomed blanks B, B.

As thus far described, our illustrated apparatus is not materially different, structurally or functionally, from conventional apparatus shown and described in the aforesaid Novick patents. The latter's "bottoming" mechanism will be recognized as typical of numerous instances in web-supply envelope making machinery wherein cooperating rotary tucker and gripper cylinders operate on successive flat tubular blanks to produce the turn-up of each blank's leading end or flap, and its stick-down to the blank wall. These stick-downs, in practically all cases, are by adhesive which the rotary tucker cylinder deposits at each revolution, either on the blank wall (as shown in said Novick patents) or else on the leading flap itself, just prior to the tucking action, as by a gluing bar or picker arranged just ahead of (instead of just behind) the usual tucker blade of said cylinder. In illustrating our invention, we have elected to follow the Novick showing in this respect—but it will be obvious that our invention is equally applicable to the above-described alternative construction for the upper or tucker cylinder 25, wherein the usual gluing bar or picker 31 precedes (rather than follows) the usual tucker blade 28.

Figure 8:
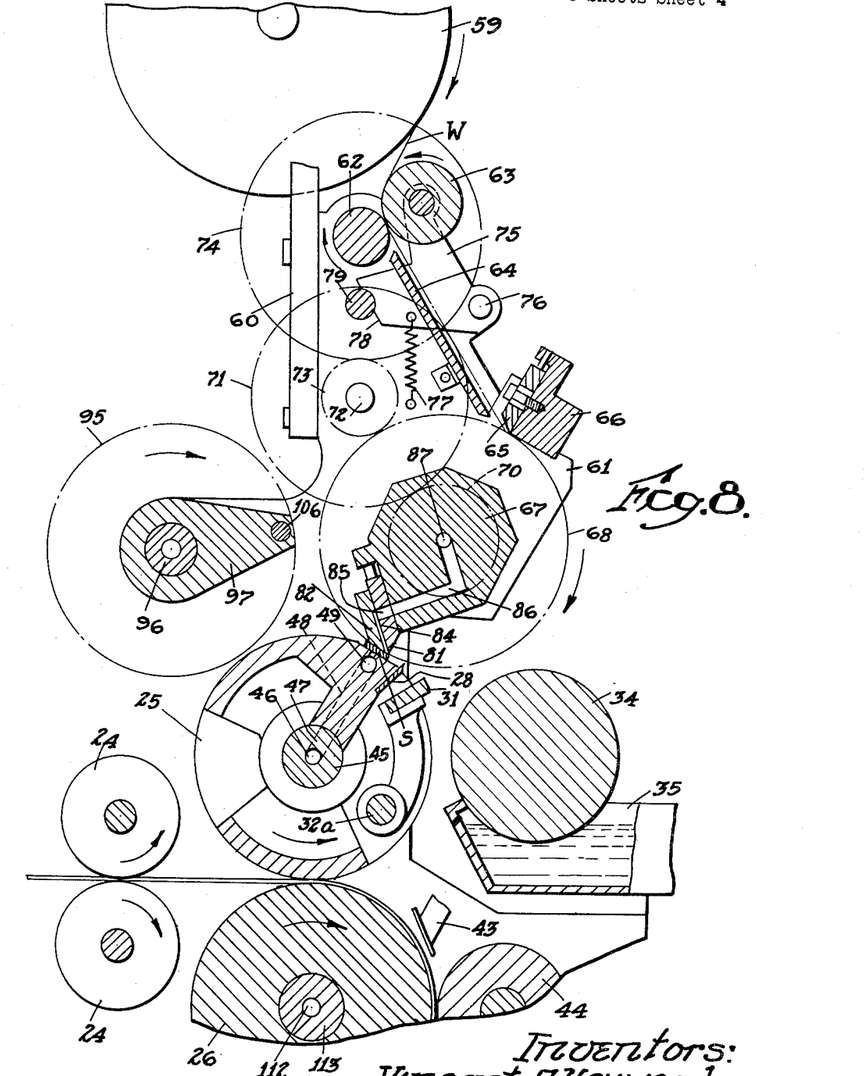
FIG. 8 is a vertical sectional view of the apparatus shown in FIG. 6.
Figure 9:
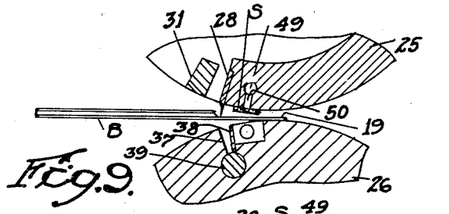
FIGS. 9 to 13 inclusive are fragmentary large scale sectional views showing successive stages in the operation of our modified "bottoming" cylinders, in adhesively sandwiching a loose-fibred strip between the envelope wall and the bottom turn-up or flap.
Figure 10:
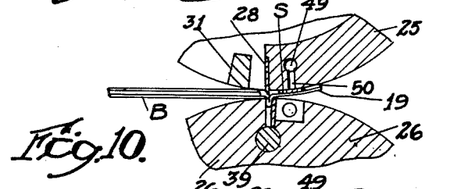
Figure 11:
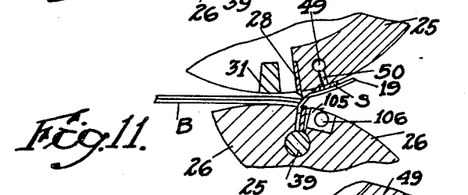
Figures 12, 13:
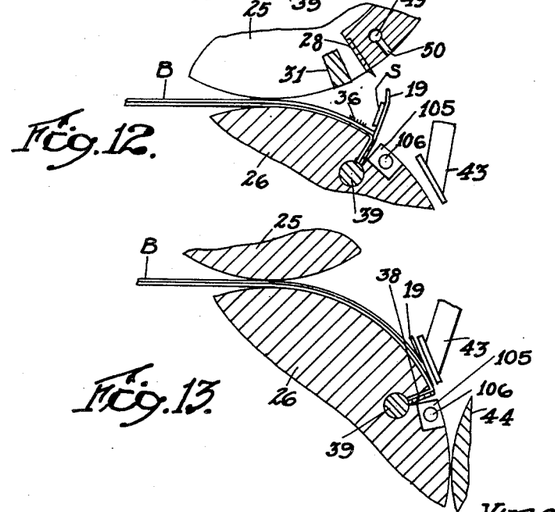
Figure 16:
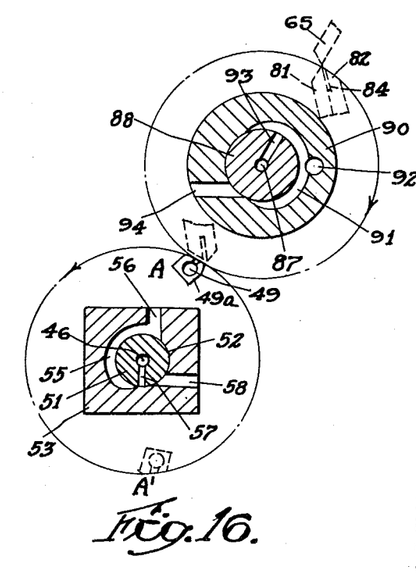
FIG. 16 is a cross-sectional view, substantially on line 16—16 of FIG. 15.

According to our invention, the upper or tucker blade cylinder 25 is secured, as best shown in FIGS. 3 and 8, to a rotary shaft 45 which provides, for a portion of its length, an axial bore or passage 46 closed at both ends. A radial extension 47 of this axial shaft passage 46 communicates at its outer end with the inner end of a generally radial passage 48 of the attached cylinder 25. This radial passage 48 communicates at its outer end with an elongated cylinder passage 49, closed at both ends, which runs lengthwise of the cylinder near its periphery. FIGS. 3 and 16 show passage 49 as provided by an attached bar 49$^a$; in other figures it is formed in the material of cylinder itself. From this cylinder passage 49, a multiplicity of small suction holes 50, 50 (best shown in FIGS. 9 to 12) open outwardly onto the cylinder's periphery in a line or row adjacent to and paralleling the cylinder's usual tucker blade 28, and on the opposite side of said blade from the cylinder's usual glue bar or picker 31.

Figure 14:
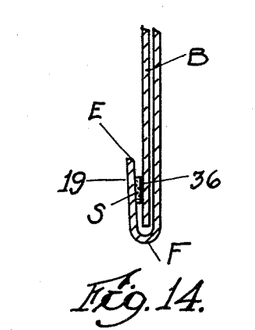
FIG. 14 is a fragmentary large scale sectional view of the bottom seam construction of envelopes or bags made in accordance with our invention.

These holes 50, 50 serve for the rotating tucker blade cylinder's suction pick-up and broadside conveyance of successive narrow loose-fibred strips S, S for applying the latter internally, one by one, at the respective bottom turn-up zones of the advancing flat tubular blanks B, B. These strips S, S have the same or a slightly greater length and width, as the customary transverse glue imprint 36 which is made on each blank B by the picker 31 of tucker blade cylinder 25. During its suction-held conveyance on said cylinder's periphery, the outer surface of each strip S is rendered adhesive in a variety of different ways, as hereinafter described in detail. Thus it is that each strip S, upon arrival at its blank's turn-up zone just ahead of tucker blade 28 (see FIG. 9) becomes adhered (see FIGS. 10 and 11), by its lower or outer surface, to the advancing blank's flap portion 19, well back of the latter's leading edge E (see FIGS. 2 and 14) and at the same distance ahead of the fold F as the blank's transverse gluing 36 is behind said fold. Cut off of the suction through holes 50, 50, substantially at the stage shown by FIG. 11, enables the flap 19, as depicted consecutively by FIGS. 12 and 13, to be folded back against the blank wall, with consequent registration and adhesion of its so-applied strip S with and to said wall's customary transverse gluing 36, by the customary cooperative action of rotary gripper cylinder 26 and folding plate 43. Thus is obtained the adhesive sandwiching of each loose-fibred strip S between the wall of its blank B and said blank's turn-up portion 19. This disposes the strip S (see FIG. 14) in condition to be split asunder, the same as in said Irrgang patent, for the so-bottomed envelope's full width opening, by a pull on the free edge E of said stuck down bottom turn-up 19.

For controlling the access of suction to and the cut-off of suction from the cylinder holes 50, 50, the axially-bored shaft 45 carrying tucker cylinder 25 has an extended portion 51 which (see FIGS. 15 and 16) enters and runs in an alined bore 52 provided by a stationary ported vacuum control member 53, suitably secured to the fixed frame 54 of the machine. Between its opposite ends, this shaft-receiving bore 52 has its concave surface cut back, as shown in FIG. 16, to provide a narrow arcuate groove or recess 55, here shown as subtending more than half the circumference of the rotating shaft extension 51 within said bore. This bore groove or space 55 is maintained at all times under suction, by its connection through a port 56 of stationary member 53 with piping 56$^a$ that runs to a suction pump or other suitable vacuum source (not shown). The shaft extension 51 provides, in the same vertical plane as this vacuum groove or space 55, a radial port or passage 57, to its axial passage 46 through which the vacuum of groove 55, during more than half of each shaft revolution, is made effective, via the axial shaft passage 46 and the radial ports 47, 48, at the suction holes 50, 50 of cylinder 25, for pick-up, at position A and counterclockwise conveyance to position A' of each loose-fibred strip S.

In this same vertical plane, the stationary member 53 provides a port 58 to the atmosphere, which is encountered by the shaft extension's radial passage 57 just beyond the lower end of vacuum groove or space 55. This serves to break the vacuum hold of the cylinder openings 50, 50 on each strip S, just after its broadside application, adhesived surface down, to the advancing blank's leading end portion of flap 19.

According to our invention, the narrow strips S, S of loose-fibred material, supplied to the suction openings 50, 50 of cylinder 25 at position A, are successively cut off broadside from an advancing web W of such material, whose width is slightly less than the width of the flat tubular blanks B, B. The web W is here shown as drawn from a supply reel 59, suitably supported well above the tucker cylinder 25, as by an upright bracket 60 that rises from a pair of spaced supplementary frame members 61, 61 (only one being shown). These frame members 61, 61 serve for the support and mounting of the web feeding and web cutting devices, now to be described, as well as of the means by which each loose-fibred strip S, during its above described suctionally-held conveyance on cylinder 25, is rendered adhesive on its outer surface.

Figures 6, 7:
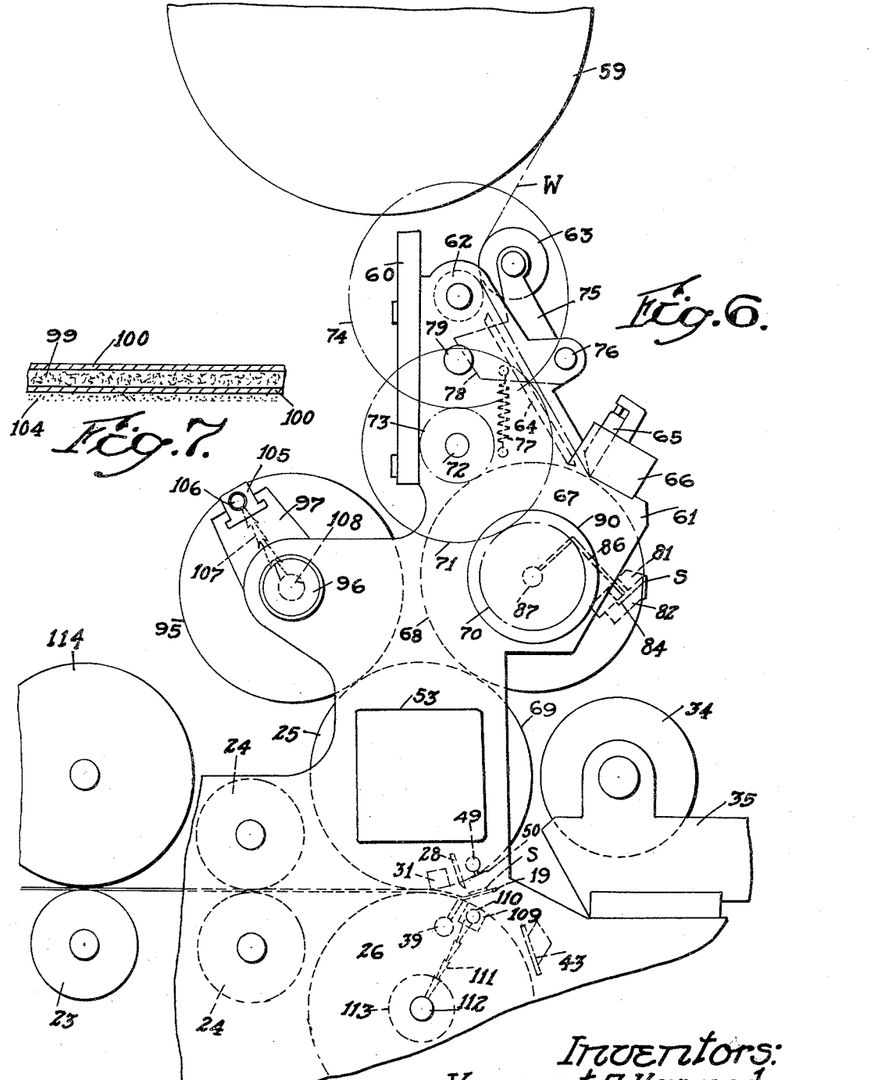
FIG. 6 is a large scale side elevation showing, for another form of our invention, the changes in and additions to the conventional "bottoming" cylinders that are needed for the invention's performance.
FIG. 7 is a fragmentary sectional view, similar to FIGS. 4 and 5, showing the construction for the strips of loose-fibred material that are supplied for the form of our invention shown by FIG. 6.

As best shown in FIGS. 3, 6 and 8, the web W is drawn from supply reel 59 by passage between a pair of geared-together slow-speed feed rolls 62, 63. Beyond these feed rolls 62, 63 the web's leading end is supported and guided by a suitably sloped support plate 64, beneath a transverse knife edge or blade 65, supported by a stationary bar 66 which extends across and is rigidly secured to the spaced-apart supplementary frame members 61, 61. These frame members provide suitable journals for the web feeding rolls 62, 63, as well as for a rotary strip severing and conveying member 67 whose axis is midway of the distance between the stationary knife edge 65 and the aforesaid position A on the upper periphery of cylinder 25. This member 67 rotates clockwise, at the same speed as the oppositely-rotating cylinder 25, by virtue of a gear 68 thereon which meshes with a gear 69, of the same size and pitch, on the shaft 45 of said cylinder.

The shaft of rotary member 67 also carries a smaller gear 70, which meshes with a larger gear 71 on a countershaft 72 journaled in and extending across the frame members 61, 61. This countershaft carries a small gear 73, which meshes with a large gear 74 on the web feeding roll 62, for driving same, and its companion roll 63, in directions such as to draw the web W at a constant slow speed from the supply reel 59. By virtue of the two above-described gear reductions, the feed rolls 62, 63 have a surface speed very much lower than the cylinder 25, such that during a single revolution of said cylinder, the advance of web W by the feeding action of rolls 62, 63 is only the width of a single narrow strip S, about a half inch, or even less. To facilitate threading of the web W between said feed rolls, the roll 63 is here shown as mounted in a bracket 75, pivoted at 76 to the frame members 61, 61, such that roll 63 is urged strongly against roll 62 by a spring 77 drawing downwardly on said bracket. An edge of said bracket is opposed to a flat surface 78 on a rockable member 79, such that when the latter is rocked by its handle member 80, the bracket is shifted about its pivot 76 to separate the feed rolls temporarily, for entrance of the web W between them.

For cooperation with stationary knife edge 65, the rotary member 67 carries a blade or knife edge 81 by which to cut off at each revolution of member 67, a narrow loose-fibred strip S from the slowly advancing web W. Secured to the outer surface of blade 81 is a plate 82, having a beveled end surface 83 substantially flush with the blade edge's circular path. The inner surface of plate 82 is shallowly recessed, such as to established with the outer surface of knife edge member 81 a narrow elongated suction slit 84 opening outwardly between cutting edge 81 and the beveled end surface 83 of plate 82. This elongated suction slit 84 is in constant communication, through a suitable blade port 85 and a registering passage 86 of a rotary member 67 with an axial bore or passage 87 of said member, through which suction is made effective at the mouth of slit 84, for said member's pick-up conveyance and transfer to cylinder 25 of the narrow loose-fibred strip S that is cut off from web W at each revolution of member 67.

Figure 15:
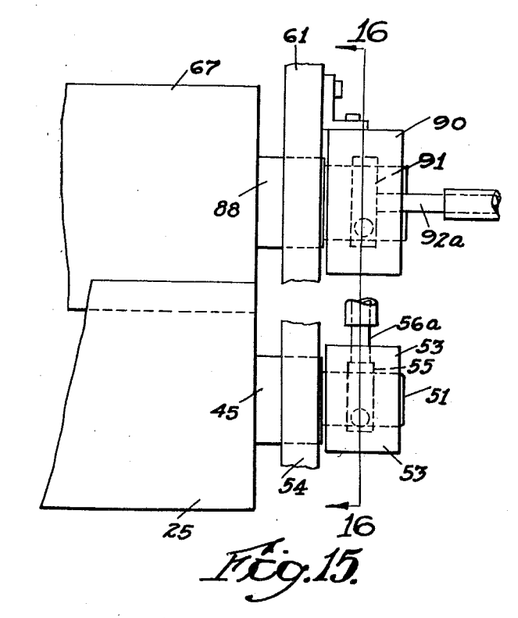
FIG. 15 is a large scale fragmentary elevational view, showing certain vacuum control devices used in the handling of the loose-fibred strips.

That is to say, the axially bored member 67 has a shaft extension 88 which enters and runs in an alined bore 89 provided by a stationary ported vacuum control member 90, suitably secured to one of the supplementary frame members 61. Between its opposite ends this shaft-receiving bore 89 has its concave surface cut back as shown in FIGS. 15 and 16 to provide a narrow arcuate groove or recess 91 that subtends somewhat more than one half the circumference of the rotating shaft extension 88 within said bore. This bore groove or space 91 is maintained at all times under suction, by its connection through a port 92 of stationary member 90 with piping 92a that runs to a suction pump or other suitable vacuum source (not shown).

The shaft extension 88 provides, in the same vertical plane as this vacuum groove or space 91, a radial port or passage 93 to its axial bore or passage 87. Thus through this port 93, passage 87 and the connecting passages 85 and 86 of rotary member 67, suction is made effective at the mouth of slit 84 for the pick-up of each narrow strip S, immediately upon its severance from web W by the cooperating knife edges 65 and 81. Each so-severed strip S is held firmly by the slit suction against the beveled outer end 83 of plate 82 during the ensuing clockwise rotation of member 67, until said strip arrives approximately at position A, this occurring (see FIG. 8) coincidently with the arrival at said position A of the suction openings 50, 50 of cylinder 25. At this instant (see FIG. 16) the radial shaft extension port 93, having reached the lower end of vacuum groove or space 91 encounters a port 94 of the member 90 which is open to the atmosphere, such as to break the vacuum hold of suction slit 84 on one surface of a strip S, coincidentally with the vacuum seizure of its other surface by the suction openings 50, 50 of cylinder 25.

Thus it is that each narrow loose-fibred strip S, as cut off from slowly-advancing web W at each revolution of member 67, is suction-seized by said member and conveyed clockwise thereon to position A, where it is transferred to and held by suction on the periphery of the rotating cylinder 25, just ahead of the latter's tucker blade 28. During each strip's ensuing counterclockwise conveyance to position A', for adhesive application as heretofore described across the leading flap portion 19 of an advancing flat tubular blank B, said strip's outer surface (the surface initially seized by the suction slit 84) is rendered adhesive or tacky, for proper anchorage of said strip to the blank's flap portion 19, before the latter is turned back, by the customary action of cylinders 25 and 26 and stationary plate 43, to register said strip's other surface with the usual transverse gluing 36 on the blank's wall portion.

Our invention provides a variety of ways and means for rendering adhesive or tacky the outer surface of each suction-held loose-fibred strip S, during its above described conveyance by cylinder 25 from position A to position A'. As shown in FIG. 3, the gear 69 of cylinder 25 meshes with a gear 95, of the same size and pitch, secured to a transverse shaft 96 that is journaled in the supplementary frame members 61, 61. This clockwise rotating shaft 96 provides parallel radial arms 97, 97 (only one being shown) which support at their outer ends a narrow elongated liquid applicator or picker 98. The latter's outer surface moves in a circular path that is tangent to the circular path of the successive suction-held strips S, S conveyed by cylinder 25, and the angular arrangement is such that the applicator's outer surface, at each revolution, makes contact with the outer surface of each so-conveyed strip.

Figure 4:
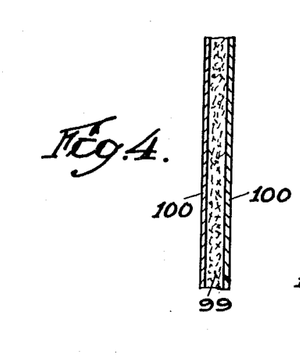

At each revolution of shaft 96, the applicator 98 receives liquid on its outer surface from a transfer roll 101 which rotates in a suitable liquid receptacle 102. If the liquid supplied to receptacle 102 be ordinary wet glue, the strips S, S may be cut from a 3-ply web W that comprises (see FIG. 4) a central thick loose-fibred ply 99 (such as blotter stock or absorbing kraft) faced with outside plies 100, 100 of thin paper, the latter preventing any undue penetration of wet glue, from applicator 98 or from the blanks' imprints 36, 36, to the loose-fibred central ply 99 of the strips S, S.

We have found wet glue to be quite satisfactory for the adhesion of the strips S, S to the blanks' flaps 19, 19, when the blanks B, B are of paper or other film or sheet material having surface characteristics that permit quick superficial penetration and fibre seizure by the wet glue, so that the strips S, S will stay put at their point of application to the blanks' flaps. On the other hand, where the envelope material of web 1 is a film material to which wet glue has little or no immediate holding affinity, it may be advantageous or sometimes essential to give the outer surface of each strip S a greater initial tack or stickiness, to make sure of its staying put, in proper position, on the flap or turn-up portion 19 of the blank B. It is neither practical nor feasible to get this greater initial tack for the outer surfaces of the strips S, S, by increasing materially the viscosity of the wet glue supplied to the receptacle 102. This is because the applicator or picker 98, under those conditions, would quickly become so sticky on its outer surface that any strip S contacted thereby could be pulled loose, in whole or in part, from the suction grip thereon of the cylinder's apertures 50, 50.

However, this difficulty, when using the form of our invention shown by FIG. 3, can be overcome by cutting the loose-fibred strips S, S from a web W having on one surface (see FIG. 5) a dried pre-coating 103 of suitable adhesive. It is this adhesive-coated surface of each strip S which is seized by the suction slit 84 of rotary cut-off member 67, so that said coated surface will be exposed or on the outside when the strip S is subsequently transferred at position A to the periphery of tucker-blade cylinder 25. When ordinary rewettable gum or glue provides, for each strip's outer surface, this dried adhesive coating 103, the latter can be re-activated by the rotary applicator or picker 98 to the required initial tack or stickiness, by supplying water to the receptacle 102, for the recurrent wetting of said applicator or picker.

When some other type of adhesive, such as a resinous adhesive, provides for each strip's outer surface this dried adhesive coating 103, the latter can be reactivated by said rotary picker 98 to the required initial tack or stickiness, by supplying the receptacle 102 with any suitable organic solvent for such resinous adhesive. In both cases, the strip's dried adhesive coating 103 is reactivated by picker 98 to a condition of tack or stickiness that enables the strip to stay put, in proper position, on the blank's flap or turn-up portion 19. But in neither case does the picker 98 itself ever become sticky enough to disturb the tucker blade cylinder's suction grip on a strip S. This is because said picker's outer surface, at each revolution, is washed clean of any adhesive, by its contact with the wet transfer roll 101.

The form of our invention shown by FIGS. 6 and 8, is predicated upon cutting the narrow strips S, S from a loose-fibred web W having on one surface (see FIG. 7) a dried pre-coating 104 of heat-sensitive adhesive. This may consist of a suitable solid or semi-solid plasticizer so dispersed in a resin that when heat is applied, the fusion of the plasticizer with the resin softens the coating 104 and gives it the required degree of tack or stickiness for each strip S to stay put, in its position of application, on the blank's flap 19. For such heat application, the arms 97, 97 of rotary shaft 96, instead of carrying a glue or other liquid applicator, carry an elongated bar 105, whose outer surface is on a radius such as to insure its contact, at each revolution of said shaft, with the so-coated surface of a strip S on the periphery of cylinder 25. The bar 105 is cored out lengthwise to receive, in close proximity to its outer surface, an electric heating element 106, to which current is supplied by suitable insulated conductors 107 that extend through arms 97, 97 to an axial bore 108 of shaft 96, for connection to any suitable source of electric current supply, not shown.

Thus it is that each loose-fibred strip S, during conveyance on cylinder 25 to the flap portion 19 of its blank B, has its outer surface rendered adhesive, to the required degree of tack or stickiness, by heating of its heat-sensitive adhesive coating 104. This makes certain that each strip S, as deposited accurately on its blank's flap 19 in position to register, upon said flap's turn-up, with the blank gluing 36, will always stay put in its deposited position. By way of maintaining and preserving this optimum initial tack or stickiness in the adhesive bond between each strip S and the flap 19 of its blank B, the periphery of gripper cylinder 26, just ahead of the movable jaw 38, may be equipped, as shown in FIG. 6, with an elongated bar 109, whose outer surface is flush with said cylinder's blank feeding surface. Said bar 109 is scored out lengthwise, to receive, in close proximity to said outer surface, an electric heating element 110, to which current is supplied by suitable insulated conductors 111 that extend to an axial bore 112 in the shaft 113 of said gripper cylinder, for connection to any suitable source of electric current supply, not shown. In this fashion the precise area of each flap 19 that receives the tacky surface of the deposited strip S, is itself heated, so as to preserve and maintain such tackiness, and thereby overcome any tendency of said strip to slip or become displaced on said flap.

We have here shown the various devices for cutting, conveying, adhesivizing and applying the narrow loose-fibred strips S, S as directly as associated with and incorporated in the usual tucker blade cylinder of conventional web-supply envelope making machinery, such as depicted by the aforesaid Novick patents. However, our invention is not limited, except as specified by the appended claims, to this particular illustrated environment for the strip cutting, conveying, adhesivizing and applying devices, since such strip handling equipment could just as well be associated with and incorporated in an earlier encountered rotary blank feeding roll or cylinder (such as the cylinder 114 of FIG. 6), of the same size and surface speed as the illustrated tucker blade cylinder 25. The latter, in that case, would not differ from the tucker blade cylinder 125 of Novick Patent No. 2,131,748.

We claim:

1. In apparatus for open end envelope or bag manufacture, of the class in which flat tubular blanks, severed successively from the leading end of a longitudinally advancing flattened tubular substantially center-seamed web, move endwise, for transverse bottom seam formation, between a tucker blade cylinder and a gripper cylinder, bo h rotating at blank speed and cooperating to give each blank near its leading end a transverse bottom fold or turn-up, in slightly spaced relation to narrow transverse gluing deposited on each blank by said tucker blade cylinder, for stick-down of said turn-up to the blank wall, the combination therewith, of suction means incorporated in said tucker blade cylinder for seizing and conveying broadside, toward and against each blank's turn-up zone, a narrow strip of loose-fibred material, means for rendering adhesive during said conveyance the exposed surface of said strip, and means for releasing said suction when the so-conveyed strip is oppositely spaced from the line of its blank's transverse fold by the same distance as said blank's transverse gluing, to adhere said strip in that position to said blank, such that upon said transverse fold's completion the loose fibred strip, from registry of its opposite surface with said transverse gluing, is adhesively sandwiched between said wall and said bottom turn-up, in condition to be split asunder, for the bag or envelope's full-width opening, by a pull on the free edge of said bottom turn-up.

2. Apparatus for quick-opening envelope or bag manufacture as claimed in claim 1, in which the tucker blade cylinder deposits the transverse gluing on each blank's wall portion, and applies the loose-fibred strip, by its adhesive surface, to the bottom turn-up portion of each blank.

3. Apparatus for quick-opening envelope or bag manufacture as claimed in claim 2, in which the tucker blade cylinder applies the loose-fibred strip to each blank's turn-up portion in a position appreciably spaced from the latter's leading edge.

4. Apparatus for quick-opening envelope or bag manufacture as claimed in claim 1, including means operative on each loose-fibred strip, during its conveyance by said tucker blade cylinder, for rendering adhesive that surface of said strip which faces the advancing blank's bottom turn-up zone.

5. Apparatus for quick-opening envelope or bag manufacture, as claimed in claim 4, in which the adhesive rendering means applies wet glue to each strip's said surface.

6. Apparatus for quick-opening envelope or bag manufacture, as claimed in claim 4, in which the adhesive-rendering means applies solvent to a dried adhesive coating on each strip's said surface.

7. Apparatus for quick-opening envelope or bag manufacture, as claimed in claim 4, in which the adhesive-rendering means supplies heat to a heat-sensitive adhesive coating on each strip's said surface.

8. Apparatus for quick-opening envelope or bag manufacture, as claimed in claim 7, including means on the gripper cylinder for applying heat to that portion of each blank's bottom turn-up zone which receives the loose-fibred strip.

9. Apparatus for quick-opening envelope or bag manufacture, as claimed in claim 1, including means for advancing the loose-fibred material in continuous web form, and means for cutting from said web and suctionally seizing broadside the successive narrow strips, for conveyance by said tucker blade cylinder to the respective bottom turn-up zones of the successive advancing blanks.

10. Apparatus for quick-opening envelope or bag manufacture as claimed in claim 9, in which the cutting means grips each strip suctionally at its line of cut off from said web, and maintains said suction grip thereon during conveyance of same to the periphery of said tucker blade cylinder.

11. Apparatus for quick-opening envelope or bag manufacture as claimed in claim 10, including suction means on said tucker blade cylinder's periphery for seizing each strip conveyed thereto by said cutting means, substantially coincident with the release of said cutting means' suction grip on said strip.

12. Apparatus for quick-opening envelope or bag manufacture as claimed in claim 11, in which the suction means on said tucker blade cylinder's periphery is adjacent and parallel to its fold-forming tucker blade, and on the opposite side thereof from said cylinder's glue depositing device.

13. Apparatus for quick-opening envelope or bag manufacture as claimed in claim 12, in which the suction means on said tucker blade cylinder's periphery precedes the tucker blade, such that by release of the suction the strip is deposited on the leading bottom turn-up portion of the blank.

14. In web supply apparatus for envelope or bag manufacture, of the class in which flat tubular blanks, successively severed from the leading end of a longitudinally advancing supply web, pre-formed to flattened longitudinally-seamed form, move endwise between a tucker blade cylinder and a gripper cylinder, rotating at blank speed and cooperating to give each blank near its leading end a transverse fold or turn-up in slightly spaced relation to a band of wet adhesive deposited transversely on each blank by the tucker blade cylinder, for said turn-up's stick-down, in the formation of a bottom closure seam, to the blank wall, the combination with said "bottoming cylinders," of means carried by the tucker blade cylinder for conveying and adhesively applying transversely to each moving blank, prior to its tranverse fold's completion, and internally of said bottom closure seam's opposed surfaces, a strip of loose-fibred material of substantially the same length and width as said band of wet adhesive, in a position oppositely spaced from the line of said fold by the same distance as said wet adhesive band, such that upon said bottom closure seam's completion, said strip, from its registry with said wet adhesive band, is adhesively sandwiched between said turn-up and the blank wall, in condition to be split asunder, for the bag or envelope's full width opening, by a pull on the free edge of said turn-up.

15. Apparatus for quick-opening envelope or bag manufacture as claimed in claim 14, including means operating in timed relation to said tucker blade cylinder for rendering adhesive each loose-fibred strip conveyed thereby.

16. Apparatus for quick-opening envelope or bag manufacture as claimed in claim 14, including means for cutting successive loose-fibred strips from a web of such material and means for conveying and transferring each so-cut strip to the tucker blade cylinder.

17. Apparatus for quick-opening envelope or bag manufacture as claimed in claim 16, including suction means on the conveying and transferring means and on the tucker blade cylinder, for holding each loose-fibred strip during its conveyance.

References Cited in the file of this patent
UNITED STATES PATENTS

| | | |
|---|---|---|
| 374,523 | Davidson | Dec. 6, 1887 |
| 1,972,995 | Irrgang | Sept. 11, 1934 |
| 2,009,857 | Potdevin | July 30, 1935 |
| 2,037,110 | Bischoff | Apr. 14, 1936 |
| 2,206,043 | Novick | July 2, 1940 |
| 2,762,271 | Mead | Sept. 11, 1956 |